United States Patent [19]

Oren

[11] Patent Number: 4,875,821
[45] Date of Patent: Oct. 24, 1989

[54] FRONT END LOADING ENCLOSED SEMI TRAILER

[76] Inventor: David D. Oren, 1270 Payne Ave., St. Paul, Minn. 55101

[21] Appl. No.: 185,320

[22] Filed: Apr. 20, 1988

Related U.S. Application Data

[63] Continuation of Ser. No. 880,706, Jul. 1, 1986, abandoned.

[51] Int. Cl.$^4$ ................................................ B60P 1/28
[52] U.S. Cl. ................................. 414/481; 414/786; 410/4; 280/763.1
[58] Field of Search ........................ 414/786, 481, 83; 410/2, 3, 4, 6, 13, 24; 280/763.1; 254/423

[56] References Cited

U.S. PATENT DOCUMENTS

| | | |
|---|---|---|
| 2,384,965 | 9/1945 | Reid . |
| 2,587,456 | 2/1952 | Francis . |
| 2,636,772 | 4/1953 | Bridge . |
| 2,668,734 | 2/1954 | Bridge . |
| 2,834,631 | 5/1958 | Taraldsen . |
| 2,883,231 | 4/1959 | Dawson . |
| 3,255,995 | 6/1966 | Bartlett ................................ 254/419 |
| 3,292,802 | 12/1966 | Hutchinson ..................... 254/419 X |
| 3,303,950 | 2/1967 | Jones . |
| 3,675,795 | 7/1972 | Dluhy . |
| 4,019,643 | 4/1977 | Kampman et al. ................. 414/481 |
| 4,047,699 | 9/1977 | Wisdom ............................. 254/423 |
| 4,074,822 | 2/1978 | Chisum ............................. 414/786 |
| 4,413,943 | 11/1983 | Liljestrom . |

FOREIGN PATENT DOCUMENTS 2107274  4/1983  United Kingdom ................ 414/481

OTHER PUBLICATIONS

Exhibit A-3 photos showing a leaseway trailer of Columbus, Ohio
Exhibit A-Magazine article discussing use of robots for loading and delivering vehicles.

*Primary Examiner*—Dave W. Arola
*Attorney, Agent, or Firm*—Merchant, Gould, Smith, Edell, Welter & Schmidt

[57] ABSTRACT

A front end loading enclosed semi trailer (20) and method of loading an enclosed semi trailer. A hitch (24) is present proximate a front end (34) for interconnection to a tractor (22). A wheel assembly (28) supports a back end (26) of the semi trailer (20). Extensible jack devices (40) are mounted proximate the first end (34) for raising and lowering the first end (34) of the semi trailer (20). Doors (36) are present at the front end (34) for allowing entrance into the semi trailer (20) whereby when lowered, the semi trailer (20) can be loaded from the front end (34).

7 Claims, 2 Drawing Sheets

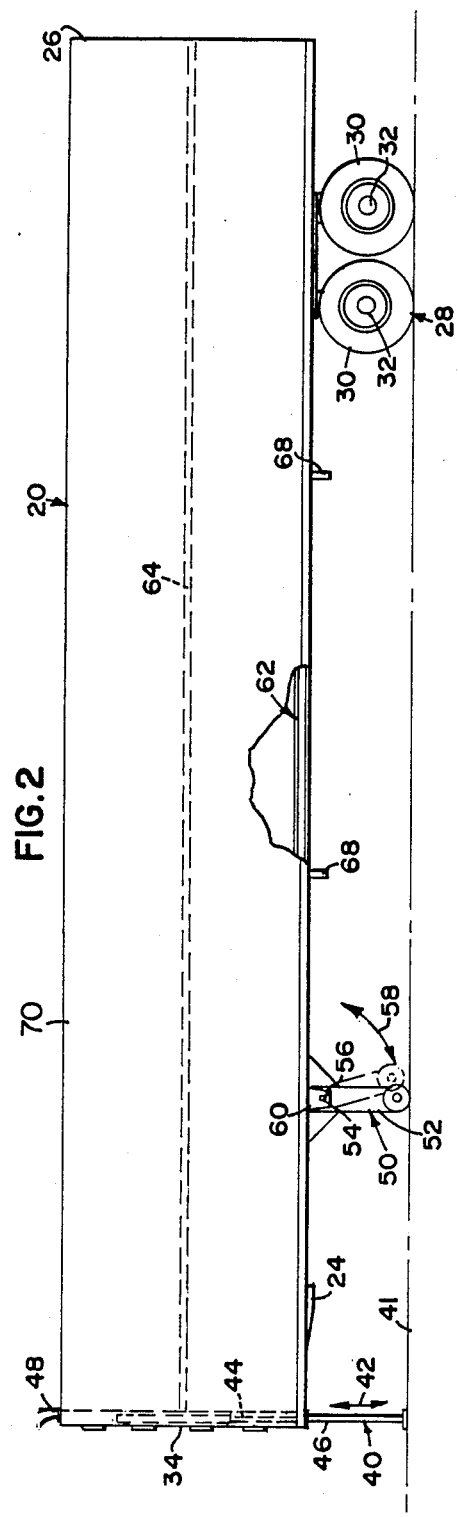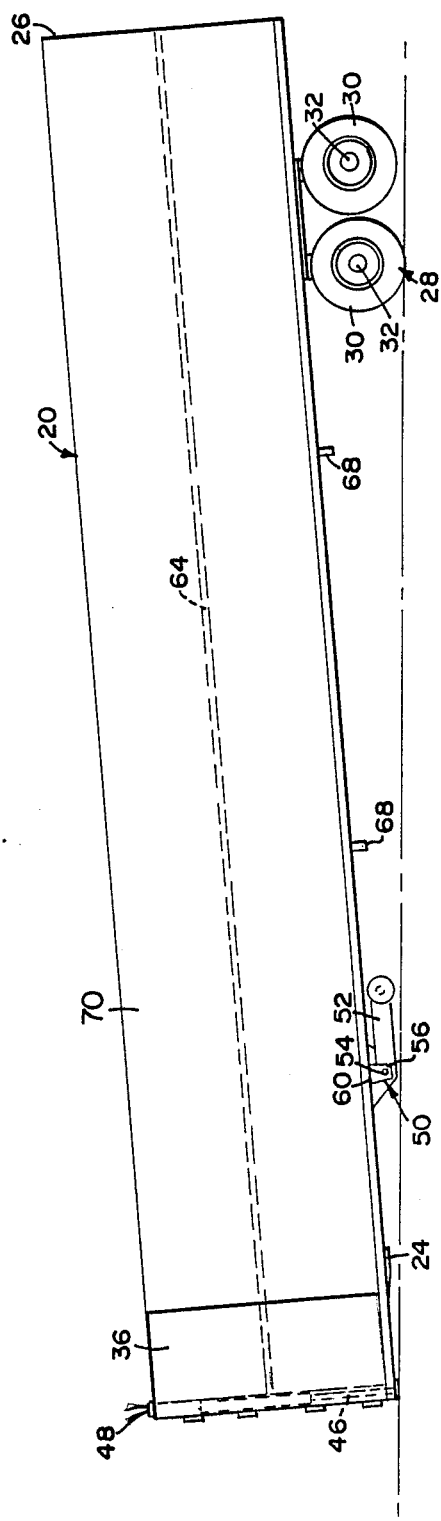

4,875,821

FRONT END LOADING ENCLOSED SEMI TRAILER

This is a continuation, of application Ser. No. 880,706, filed July 1, 1986, now abandoned.

BACKGROUND OF THE INVENTION

The present invention relates in general to load transport vehicles and methods for loading same. More particularly, the present invention relates to an enclosed semi trailer which can be loaded from the front end, and method of loading an enclosed semi trailer.

Currently land transportation of automobiles takes two forms. Most commonly rail cars designed to haul automobiles pick up automobiles at the automobile manufacturer's dock. Since automobile dealerships don't have rail service, the automobiles are delivered to a hub. At the hub they are unloaded from the rail cars and loaded onto specialized automobile hauling truck and trailers. Trucks then make the final delivery. Hauling automobiles on specialized automobile hauling trucks and trailers from the manufacturer directly to the dealer is the other common way of hauling automobiles.

The freight rate for the rail car to distribution yard to truck method of delivering automobiles is dependent on the carrier's costs. Rail carriers must haul automobiles on rail cars designed especially for that purpose. These specially designed rail cars are either open or shielded from vandalism, but are almost never totally enclosed. Since most freight needs to be kept dry and isolated from the elements, the railroad cars used to haul automobiles on the front haul cannot be used on the return or backhaul trip to haul other freight, and thus, are rather unproductive. Moreover, even if automobile hauling railroad cars were made waterproof, they would be difficult to utilize because the space provided is typically not a standardized size, and thus presents problems when loading and unloading.

The cost of maintaining hub yards and the equipment to operate hem is significant. Vandalism and theft regularly occur at hub yards. Automobiles must be unloaded from the rail cars onto the hub yards then reloaded into the specialized auto hauling tractors and trailers. This process is slow, labor intensive, leads to handling damage, and therefore, costly.

Other problems with railroad cars are related to their fixed route and longer travel time. While it is cost effective for the railroads to be positioned at the automobile manufacturer, it is not practical, or many times not possible to have service to the dealers. Railroads are therefore dependent on slow, inefficient hub yards. Since the number of vehicles in transit or the value of the inventory in transit is tremendous, this time delay results in a substantial loss of operating profits for the automobile manufacturer. The overall value of automobiles in transit could be significantly reduced if the automobiles were only handled once.

Specialized auto hauling trucking companies in some cases successfully compete against rail carriers because of their shorter delivery time and single source accountability. Their direct cost per mile is higher than rail, but their faster service can offset the rate difference.

Auto hauling trucking companies have high costs because of their high deadhead and low equipment utilization. Their trailers cannot be used for other types of freight. They incur a high percentage of empty to loaded miles because of their limited shipper base. Their freight rate must reflect those extra empty miles. Auto hauling trucking companies experience a high deadhead ratio compared to other truckload carriers.

The specialized expensive equipment required by auto hauling trucking companies also increases their costs and ultimately their freight rate. The tractors are specially designed with ramps overhead to haul one car. The tractors also use special fuel tanks, special towing hooks, hydraulic pumps, and other non-standard equipment. The auto hauling trailer's initial purchase price is 4 to 6 times higher than conventional vans. Automobile hauling trailers are complex and expensive to maintain.

Another problem with automobile hauling tractors and trailers is their lack of protection from the elements. Due to the open design of automobile hauling semi tractors and trailer, the automobiles they haul are not protected from vandalism, theft or accidental rock chips.

Generally, automobile manufactureres have several concerns with the current distributed rail or direct truck service. Rail service is slow. The length of time in transit is related to customer and dealer satisfaction for ordered cars and cost of inventory in transit. Another concern with both rail and trucking carriers is the final delivery of a clean undamaged product. Finally, the freight rate combined with the indirect costs is the automobile manfacturer's total distribution cost.

SUMMARY OF THE INVENTION

The present invention relates to an enclosed semi trailer. The semi trailer includes hitch means for interconnection to and support by a tractor at a front end. Wheel assembly means is present at a back end of the semi trailer for supporting the back end of the semi trailer off the surface of the ground. Extensible jack means are mounted proximate the front end of the semi trailer for raising and lowering the front end. Door means is present at the front end for entrance into the semi trailer whereby when in a lowered position, the semi trailer can be loaded from the front end.

Additionally, the present invention relates to a method for loading enclosed semi trailers. The method includes opening door means at a front end of the semi trailer, lowering the front end of the semi trailer to proximate the surface of the ground, and loading cargo in through the front end of the semi trailer when so lowered.

The present invention allows carriers to get front haul rates in both directions. For example, while there is high rated freight for dry vans going into the East Coast from other regions, there is very little freight originating on the East Coast so the freight available is low rated. Since European automobiles are delivered to ports on the East Coast, the movement of those cars into other regions is a front haul. Increasing the customer base also reduces empty miles, and, therefore, increases productivity.

This invention offers a dry, enclosed, protected environment for automobiles. As automobile prices escalate, so does the need for more protection from theft, vandalism, and rock chips. This trailer of this invention meets automobile manufacturers' concerns for more protection and less surprises.

Delivering by truck is the fastest type of automobile transportation.

The present invention provides an automobile hauling semi trailer which is four to six times less expensive than specialized automobile trailers. The present invention enables use of fairly conventional semi-trailer construction and completely conventional tractors.

In one embodiment of the present invention, the semi trailer is double decked to allow two layers of automobiles to be transported.

Still another advantage of the present invention is that it provides a method of loading and unloading an enclosed semi trailer without use of a loading dock structure. Additionally, the loading can be accomplished with a lift device such as a forklift without an accompanying dock. It will be appreciated that the present invention has application to load transport vehicles in general, and can be utilized for carrying all types of freight. This is particularly advantageous, since while loading will probably usually take place at a loading dock, an ever increasing number of deliveries must be made where there is no loading dock structure. In addition, ground level loading and unloading is safer than above ground loading, thereby reducing the number of injuries from falling out of a semi trailer when unloading or from dropping cargo on someone.

The concept of semi trailers for carrying both general freight and automobiles is not new. For example, U.S. Pat. Nos. 2,668,734 and 2,636,772 disclose such trailers. Also, the concept of near ground loading semi trailers is not new to the industry. For example, U.S. Pat. Nos. 3,303,950 and 4,413,943 disclose semi trailers wherein the rear wheels slide forwardly of the semi trailer enabling the rear end of the trailer to be lowered to the ground, or proximate thereto. The semi trailers are then loaded from the rear end. However, the sliding wheel assemblies designed to lower the rear of the trailer make for an expensive, non-standard and heavy semi trailer arrangement. It will be appreciated that the front end loading concept of the present invention can be adapted for use with fairly standard semi trailers and completely standard tractors, and at a relatively marginal cost with only a small weight penalty. Moreover, in addition to enabling front loading, the semi trailer of the present invention will typically have doors at the back as with most conventional trailers, so as to allow rear loading as well when desired.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views;

FIG. 2 is a side elevational view of the semi trailer shown in FIG. 1 being disconnected from the tractor and in a raised position; and FIG. 3 is a view similar to that of FIG. 2 illustrating the semi trailer in a lowered position.

DETAILED DESCRIPTION OF A PREFERRED EMBODIMENT OF THE INVENTION

Figure 1:
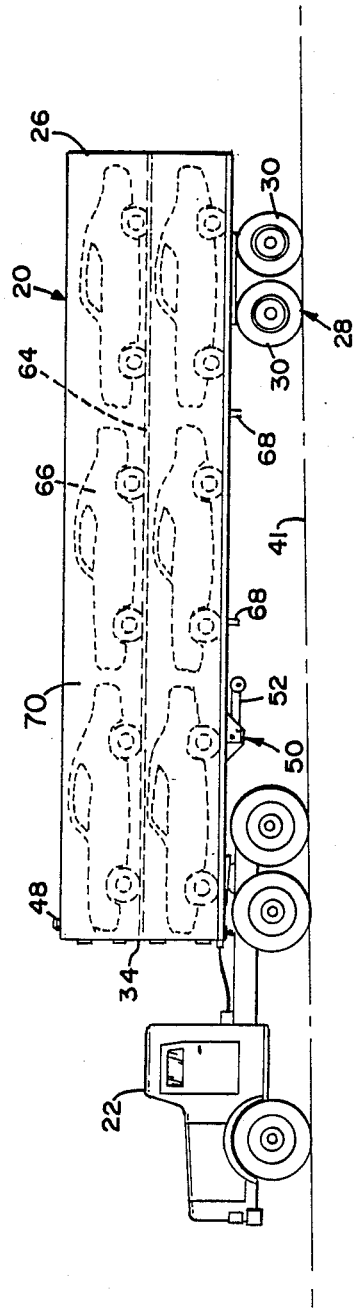
FIG. 1 is a side elevational view of an embodiment of a tractor, and semi trailer in accordance with the principles of the present invention.

As shown generally in FIGS. 1 through 3, the illustrated embodiment of the semi trailer 20 is interconnected to a tractor 22 by a suitable hitch 24, often referred to as a fifth wheel. A rear end 26 of the semi trailer 20 is supported and carried off a surface of the ground 41 by a wheel assembly 28 such as a tandem wheel assembly, including wheels 30 mounted on two independent axles 32. Although not shown, the semi trailer includes a door arrangement at the back end 26 as is typical with most semi trailers.

At a front end 34 of the semi trailer 20, doors 36 are mounted on suitable hinges 38 for movement about a vertical axis. Mounted in each of the opposing corners of the front end 34 are two extensible jack devices 40, the movement of the jack devices 40 being generally illustrated by the double headed arrow 42. In the embodiment shown, the jack devices 40 comprise a cylinder 44, piston 46, arrangement operated by hydraulic fluid delivered through hydraulic cables 48. It will be appreciated that the jack devices 40 might be operated by any other number of suitable methods and might be manually operated. In addition, the jack devices 40 might take any number of configurations other than a piston/cylinder arrangement. For example, a scissors type jack, a ratchet type jack, etc. In addition, the jack devices 40 might be mounted in any number of locations. For example, the jack might be mounted under the trailer. At the time of use, the jack could be pivoted out beyond the side of the trailer. In the embodiment shown, it is anticipated that the hydraulic cables 48 might be interconnected to air pressure and a source of air pressure on the tractor 22. Additionally, while the doors 36 are illustrated as being mounted for pivotal movement on a vertical axis, it will be appreciated that doors might also be mounted for pivotal movement about a horizontal axis such that they might swing upward or downward depending on the specific configuration utilized. In the preferred embodiment, the doors 36 and the jack devices 40 are mounted on the semi trailer 20 so as to provide little, if any, interference with loading at the front end 34 of the semi trailer 20. Positioned in back of the jack devices 40, is a landing gear arrangement 50. The landing gear 50 includes a lower elongated member 52 pivotal about a pivot point 54. A lock pin 56 is preferably present to lock the landing gear member 52 in the vertical position. The landing gear member 52 has a pivotal motion as generally illustrated by the double headed arrow 58. As illustrated in FIG. 3, the jack device 40 can be compressed and the landing gear member 52 pivoted under the semi trailer 20 so as to enable the front end 34 of the semi trailer to lower to the surface of the ground 41. Prior to lowering the front end 34, the lock pin 56 of the landing gear arrangement is removed and the landing gear member 52 manually forced out of the vertical position such that as the front end 34 of the trailer is lowered, the landing gear member 52 will pivot about the pivot point 54. A suitable support structure 60 will interconnect the landing gear to the semi trailer 20.

Once the front end 34 is lowered to the surface of the ground 41, the semi trailer 20 can be loaded from the front end 34. The present invention has particular application for carrying automobiles. As illustrated in the cutaway portion of FIG. 2, the semi trailer will include a support decking 62 having a suitable support structure and automobile ramping so as to enable the automobiles to be driven onto the ramping and into the semi trailer 20. It will be appreciated that car decking is well known in the transportation industry and therefore a detailed description of such decking will not be provided herein. One example of such decking is that distributed by Kinedyne of Northbranch, N.J., which distributes decking beams for series E and A Track Applications. In the preferred embodiment of the present invention, a second level of decking 64 will be provided so as to enable two levels of automobiles 66 to be carried in the semi trailer 20 as generally illustrated in FIG. 1. A ramp (not shown) for loading the second level of decking 64 might be carried beneath the semi trailer 20 by a support structure arrangement 68. In addition, when the semi trailer 20 is hauling conventional cargo other than automobiles, the car ramps and other decking items might also be carried by the support structure 68 underneath the semi trailer 20. Typical automobile decking arrangements will include shoring beams and bars mounted on walls 70 on the semi trailer 20 for supporting tracks on which the wheels of the automobiles 66 rest. Preferably, the walls 70 will include perforations therein for attachment of the decking beams. The perforations will typically go completely through the trailer and an extrusion will be used to cover the holes on the outside of the trailer.

Accordingly, the present invention enables loading of automobiles through the front end of an enclosed semi trailer. On the return trip or backhaul, the decking 62,64 can be disassembled and conventional cargo transported. The conventional cargo can be loaded through doors at the back end 26 of the semi trailer 20 if so desired. The present invention provides a unique semi trailer and method of loading same which requires minimal modification to existing semi trailers. No elaborate, expensive rear wheel arrangement is required which will slide longitudinally of the trailer. Preferably, the wheel arrangement 28 will include a two-axle arrangement. During loading, the semi trailer 20 will be supported largely by the front axle of the two-axle arrangement.

It is to be understood that even though the above numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad, general meaning of the terms in which the appended claims are expressed.

What is claimed is:

1. A substantially enclosed semi trailer, comprising:
   (a) hitch means proximate a front end of the semi trailer for interconnection to and support by a tractor at the front end of the semi trailer;
   (b) wheel assembly means for supporting a back end of the trailer above the surface of the ground;
   (c) extensible jack means disposed proximate the front end of the semi trailer for raising and lowering the front end of the semi trailer;
   (d) door means at the front end of the semi trailer for allowing entrance into the semi trailer, whereby when lowered, the semi trailer can be loaded from the front end; and
   (e) landing gear means for supporting the front end of the semi trailer above the surface of the ground.

2. A substantially enclosed semi trailer in accordance with claim 1 further including first deck means for supporting automobiles in the semi trailer.

3. A substantially enclosed semi trailer in accordance with claim 2 further including second deck means vertically displaced from the first deck means for supporting a second layer of automobiles, the first and second deck means being at least partially removable from the semi trailer.

4. A substantially enclosed semi trailer in accordance with claim 2, further including support structure means positioned under the semi trailer for carrying elements of the first deck means.

5. A substantially enclosed semi trailer in accordance with claim 1 wherein the extensible jack means is pneumatically operated.

6. A substantially enclosed semi trailer in accordance with claim 1, wherein the landing gear means is collapsible so as to not interfere with lowering of the front end of the semi trailer.

7. A substantially enclosed automobile transport vehicle having front and back end walls and two spaced apart side walls, comprising:
   (a) hitch means proximate a front end of the load transport vehicle for interconnection to and support by a tractor at the front end of the transport vehicle;
   (b) wheel assembly means for supporting a back end of the load transport vehicle above the surface of the ground;
   (c) jack means disposed proximate the front end of the load transport vehicle for raising and lowering the front end of the load transport vehicle to proximate the surface of the ground;
   (d) door means at the front end of the load transport vehicle for allowing entrance into the load transport vehicle, whereby when lowered, the load transport vehicle can be loaded from the front end;
   (e) landing gear means for supporting the front end of the transport vehicle above the surface of the ground; and
   (f) deck means interconnected to the side walls of the transport vehicle for supporting automobiles in the transport vehicle.

* * * * *